US010230494B2

(12) United States Patent
Busby et al.

(10) Patent No.: US 10,230,494 B2
(45) Date of Patent: Mar. 12, 2019

(54) GASKET HAVING A PLIABLE RESILIENT BODY WITH A PERIMETER HAVING CHARACTERISTICS DIFFERENT THAN THE BODY

(71) Applicant: Aviation Devices & Electronic Components, L.L.C., Fort Worth, TX (US)

(72) Inventors: Jeff Busby, Millsap, TX (US); Kent Boomer, Aledo, TX (US); Matt Boyd, Fort Worth, TX (US); Michael Dry, Fort Worth, TX (US)

(73) Assignee: THE PATENT WELL LLC, Fort Worth, TX (US)

( * ) Notice: Subject to any disclaimer, the term of this patent is extended or adjusted under 35 U.S.C. 154(b) by 720 days.

(21) Appl. No.: 14/317,917

(22) Filed: Jun. 27, 2014

(65) Prior Publication Data

US 2014/0326830 A1    Nov. 6, 2014

Related U.S. Application Data

(62) Division of application No. 13/469,603, filed on May 11, 2012.

(60) Provisional application No. 61/484,879, filed on May 11, 2011.

(51) Int. Cl.
| | |
|---|---|
| *B64C 1/00* | (2006.01) |
| *H04L 1/00* | (2006.01) |
| *F16J 15/12* | (2006.01) |
| *H04L 12/26* | (2006.01) |

(52) U.S. Cl.
CPC .............. *H04L 1/0045* (2013.01); *B64C 1/00* (2013.01); *F16J 15/123* (2013.01); *H04L 43/0823* (2013.01)

(58) Field of Classification Search
CPC .............. B64C 1/00; B64C 1/36; F16J 15/061
See application file for complete search history.

(56) References Cited

U.S. PATENT DOCUMENTS

| | | | |
|---|---|---|---|
| 1,851,948 A | 3/1932 | Summers | |
| 2,092,393 A | 9/1937 | Hewitt | |
| 2,580,546 A * | 1/1952 | Hobson, Jr. ............ | F16J 15/104 277/652 |
| 3,126,440 A | 3/1964 | Goodloe | |

(Continued)

FOREIGN PATENT DOCUMENTS

| | | | | |
|---|---|---|---|---|
| JP | 09109346 A | 4/1997 | | |
| JP | WO 2010061806 A1 * | 6/2010 | ............ | F02F 11/002 |
| WO | 2005030893 | 9/2004 | | |

OTHER PUBLICATIONS

Loos & Co., Inc., Knitted Wire Mesh, www.loosco.com/index.php?page=knitted-wire-mesh, 3 pages Dec. 7, 2012.

*Primary Examiner* — Philip J Bonzell
(74) *Attorney, Agent, or Firm* — Jackson Walker, LLP (57) ABSTRACT

A single piece gasket is disclosed having a skeletal member, typically metallic, and a pliable body. The pliable body includes a first portion having a first firmness and a second perimeter portion have a firmer consistency. When such a composite body is placed under compression, the perimeter will tend to limit the flow of the softer inner material past the firmer perimeter region or portion of the gasket. In this manner, creep or overrun of the less firm portion material will be reduced.

31 Claims, 11 Drawing Sheets

(56) References Cited

U.S. PATENT DOCUMENTS

| | | | | |
|---|---|---|---|---|
| 3,473,813 | A | 10/1969 | Meyers | |
| 3,532,349 | A | 10/1970 | Czernik | |
| 3,542,939 | A | 11/1970 | Mintz | |
| 3,555,168 | A | 1/1971 | Frykberg | |
| 3,993,833 | A | 11/1976 | Esmay | |
| 4,037,009 | A | 7/1977 | Severinsen | |
| 4,530,443 | A | 7/1985 | Gorges | |
| 4,540,183 | A * | 9/1985 | Schneider | F16J 15/10 277/312 |
| 4,544,169 | A | 10/1985 | Cobb | |
| 4,579,248 | A | 4/1986 | Gorges | |
| 4,635,949 | A | 1/1987 | Lucas | |
| 4,835,060 | A | 5/1989 | Kosiarski | |
| 4,900,629 | A | 2/1990 | Pitolaj | |
| 5,158,638 | A | 10/1992 | Osanami | |
| 5,240,766 | A | 8/1993 | Foster | |
| 5,437,767 | A | 8/1995 | Halout et al. | |
| 5,512,709 | A | 4/1996 | Jencks et al. | |
| 5,536,565 | A | 7/1996 | Halout et al. | |
| 5,702,111 | A | 12/1997 | Smith | |
| 5,791,654 | A | 8/1998 | Gaines et al. | |
| 5,890,719 | A | 4/1999 | Bettencourt | |
| 5,910,524 | A | 6/1999 | Kalinoski | |
| 5,929,138 | A | 7/1999 | Mercer et al. | |
| 6,056,526 | A | 5/2000 | Sato | |
| 6,093,467 | A * | 7/2000 | Forry | F16J 15/104 277/590 |
| 6,268,020 | B1 * | 7/2001 | Forry | F16J 15/123 427/284 |
| 6,346,330 | B1 | 2/2002 | Huang et al. | |
| 6,403,226 | B1 | 6/2002 | Biernath et al. | |
| 6,530,577 | B1 | 3/2003 | Busby | |
| 6,553,664 | B1 | 4/2003 | Schenk | |
| 6,626,439 | B1 * | 9/2003 | Forry | F16J 15/104 277/592 |
| 6,695,320 | B2 | 2/2004 | Busby | |
| 6,857,638 | B2 | 2/2005 | Dupont et al. | |
| 7,229,516 | B2 | 1/2007 | Busby | |
| 7,314,898 | B2 | 1/2008 | Downing, Jr. et al. | |
| 7,455,301 | B2 | 11/2008 | Ragsdale et al. | |
| 7,654,538 | B2 | 2/2010 | Oka | |
| 2002/0135137 | A1 | 9/2002 | Hammi | |
| 2005/0023768 | A1 | 2/2005 | Adams | |
| 2009/0322040 | A1 | 12/2009 | Banba | |
| 2010/0258200 | A1 | 10/2010 | Walker | |
| 2011/0156353 | A1 | 6/2011 | Kabutoya et al. | |
| 2011/0227295 | A1 * | 9/2011 | Watanabe | F02F 11/002 277/591 |
| 2012/0048612 | A1 | 3/2012 | Bunyan et al. | |
| 2013/0092410 | A1 | 4/2013 | Bunyan et al. | |
| 2013/0273342 | A1 | 10/2013 | Johnson et al. | |
| 2014/0334868 | A1 | 11/2014 | Apfel | |

\* cited by examiner

GASKET HAVING A PLIABLE RESILIENT BODY WITH A PERIMETER HAVING CHARACTERISTICS DIFFERENT THAN THE BODY

This divisional patent application claims the benefit of priority of co-pending U.S. patent application Ser. No. 13/469,603, filed May 11, 2012; and U.S. Provisional Patent Application Ser. No. 61/484,879, filed May 11, 2011, and incorporates herein by reference U.S. Pat. Nos. 6,530,577; 6,695,320; and 7,229,516.

FIELD OF THE INVENTION

Gaskets, including aircraft gaskets, having a perimeter of greater firmness than the non-perimeter, more tacky portion thereof.

BACKGROUND OF THE INVENTION

Gaskets provide a mechanical seal that fills the space between two mating surfaces. They may be provided to prevent leakage from or into the pieces under compression. Gaskets typically can allow less than perfect mating surfaces on machine parts where they can fill irregularities. Gaskets are commonly produced from cutting sheet materials, such as gasket paper, rubber, silicon, metal, cork, felt, neoprene, nitrile rubber, fiberglass or plastic polymer, such as polychloro, trifloro ethylene.

Pre-cured polyurethane and antenna gaskets have been provided with aluminum skeletal carrier die cut to fit the workpiece, such as an aircraft antenna. The polyurethane provides an effective environmental sealant. It also demonstrates excellent cohesion after installation and provides a high degree of environmental protection, still allowing for easy removal of the workpiece.

Polyurethane provides a non-hazardous seal with no silicon oil residue before, during or after installation or removal. Moreover, polyurethane is not problematic with paint adhesion or preparation and there is no peripheral silicon contamination. Polyurethane provides a positive moisture barrier for easy workpiece removal and provides noise and vibration dampening.

In some applications, however, some polyurethane may creep under compression creating an overrun outside the gasket area. This may sometimes require manual removal.

SUMMARY OF THE INVENTION

Various embodiments of Applicants' device are enclosed, which feature a single piece gasket having a skeletal member having a pliable body, wherein the pliable body typically includes a first portion having a first firmness and a second, perimeter portion, having a firmer consistency. When such a composite body is placed under compression, the perimeter will tend to limit the flow of the softer inner material past the firmer perimeter region or portion of the gasket. In this manner, creep or overrun of the less firm first portion material will be substantially reduced or eliminated.

Thus, in one version of Applicants' embodiment, a dual firmness body, such as a polyurethane body, will have a first firmness of a first portion of the body and a firmer consistency and resistant to compression over a perimeter or second region, which second or perimeter region typically conforms to the outer edges of the workpiece.

DETAILED DESCRIPTION OF THE PREFERRED EMBODIMENT

FIGS. 4A thru 4D illustrate a first embodiment 10a of Applicants' improved gasket. Gasket 10a, like the embodiments that follow, will provide for a workpiece WP to Base mechanical seal over substantially the entire surface of the workpiece and the base beneath the workpiece.

Figure 1:
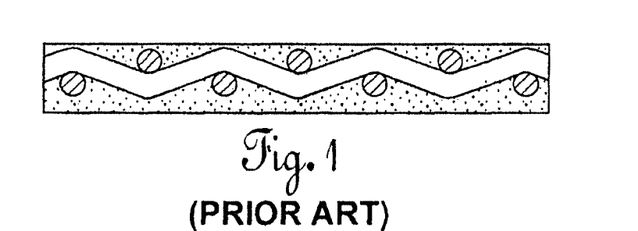
FIG. 1 is a side elevational cutaway view of one embodiment of prior art gaskets as taught by the following U.S. Pat. Nos. 7,229,516; 6,695,320; and 6,530,577, all of which are incorporated herein by reference.
Figure 2:
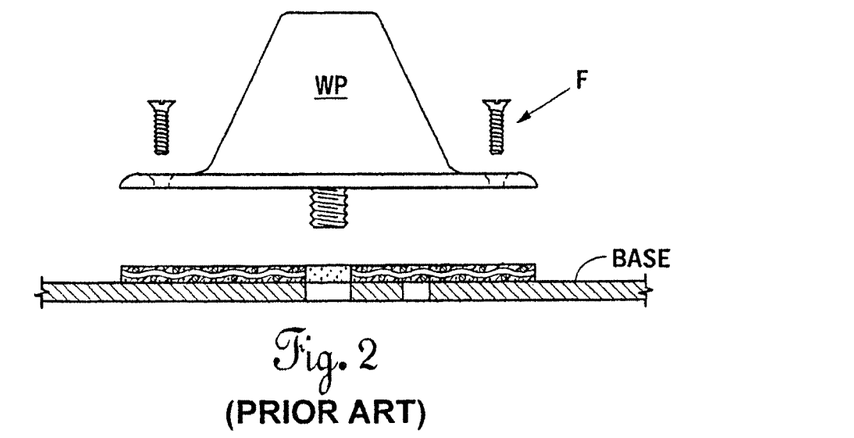
FIG. 2 is an exploded side elevational view of a prior art gasket, such as that in FIG. 1 used under compression between a workpiece WP and a base.
Figure 3:
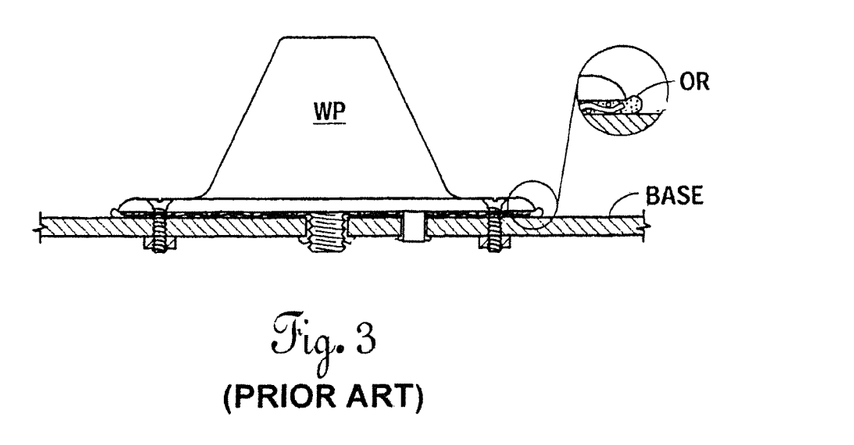
FIG. 3 is the illustration of FIG. 2, with the gasket in place and under compression between the workpiece and the base, illustrating overrun "OR" of some of the gasket material where it has seeped out past the edge of the workpiece outer perimeter.
Figure 4A:
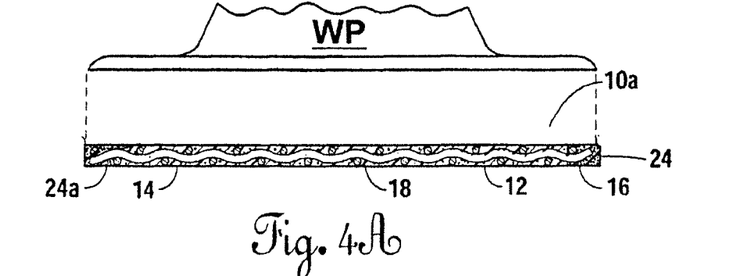
FIG. 4A is a side, cutaway elevational view of a first embodiment of Applicants' dual firmness gasket having a skeletal member.

The pre-compression thickness of the embodiments set forth herein may be about 55 mil (range about 25-100 mil). Gasket 10a comprises of a resilient body 12, typically made from pre-cured polyurethane gasket material, such as KBS, Fort Worth, Tex., as disclosed in the patents that are incorporated by reference. Body 12 is seen to have a first portion 14 having a first firmness, such as a firmness between about 75 and about 150 (measured with a 37.5 g half cone penetrometer). The second firmer perimeter portion 16 is seen to comprise the outer perimeter of the gasket, which generally mimics the shape of the outer perimeter of the workpiece, in which second firmer perimeter portion 16 may have a durometer hardness "00" of between about 15 and about 75. The perimeter portion may be made from HT3326-5 and the body or inner portion may be made from a mix of P-1011 and U-1010. This will provide a gasket within the firmness range set forth in this paragraph.

It is seen that the relationship of the first portion to the second portion is one of typically close, adjacent, contiguous integral and/or intimate relation of one portion with respect to the other along common face 23. That is to say, they lay adjacent one another and indeed may intermingle one portion to the other at least close to the boundary portion or common face 23 between the first and second portions. Moreover, it is seen with reference to FIGS. 6, 8, 10, 12, and 14 that, while the first, less firm portion 14 may be typically tabular in nature, the second firmer perimeter portion 16 may take a number of cross-sectional configurations. These configurations may be varied, first to provide an effective seal, under compression, against overrun of the first portion outside the boundaries generally defined by the second perimeter portion, as well as to provide an effective and an aesthetically pleasing mechanical seal. In some cases, a bead portion, or more generally, a formed portion extending beyond the perimeter of the workpiece (see, for example, the detail view of FIG. 7) is provided.

That is to say, Applicants provide for a number of cross-sectional configurations to the second, firmer perimeter portion 16, which are designed to provide both an effective seal and/or a visually pleasing perimeter. This is achieved, in part, by providing a second material at an outer perimeter having a firmer consistency, while being substantially integral with the first portion 14.

Some embodiments of Applicants' gaskets disclosed herein have configured second portions 16 as more generally described hereinbelow. The shapes may generally be described as: 10a tabular; 10b tabular (with raised lips); 10c curved (convex); 10d toothed or ribbed; 10e curved (concave); and 10f trapezoid.

In the embodiments illustrated, a flexible skeleton 18/20 is provided. The flexible skeleton 18/20 is in the embodiment illustrated in FIG. 4A, a mesh skeleton 18, such as woven 5056 aluminum alloy for conductive applications or woven fiberglass for non-conductive applications, or as seen in FIG. 4B, may be seen to be a non-mesh, flexible solid fabric 20, such as polytetrafluoroethylene (PTFE) or any suitable material.

In either form of flexible skeleton 18/20, it is seen that the skeletal member is usually substantially encapsulated in the resilient body 12 and may add strength to the gasket as well as integrity between portions 14/16 as, seen in the illustrations, the skeletons 18/20 typically extend substantially throughout first portion 14 and typically, at least partially, into perimeter or second portion 16.

Figure 4B:
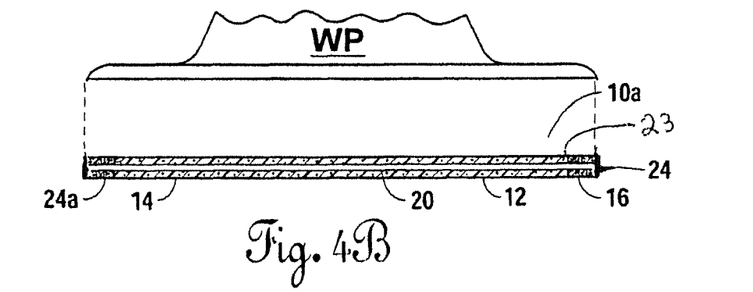
FIG. 4B illustrates a side elevational view in cross-section of first embodiment of Applicants' new gasket and the manner in which it aligns with the workpiece outer perimeter prior to compression between the workpiece and the base.
Figure 4C:
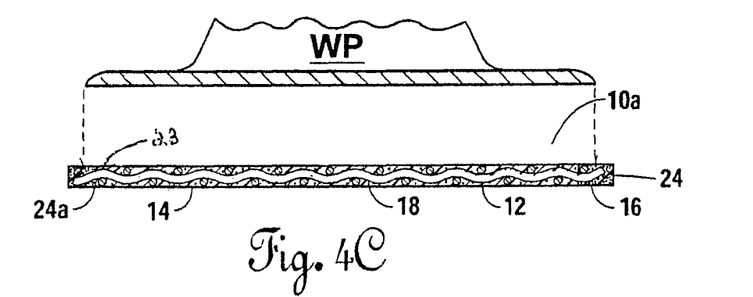
FIG. 4C illustrates the first embodiment in an "overcut" application of Applicants' improved gasket in a side elevational view illustrating the relationship between the firmer perimeter of the gasket and the perimeter of the workpiece prior to compression, wherein the outer perimeter of the gasket extends slightly beyond the outer perimeter of the workpiece.

Turning to FIGS. 4A and 4B, it is seen that the first embodiment of Applicants' device provides a relatively narrow second portion 16 in cross-section 24A, at least compared to the first portion, which second portion 16 may have a width of about 75 to about 250 mil. As set forth above, in embodiment 10a, the pre-compression thickness of first and second portions is the same, typically about 55 mil (range 25-100 mil). The other embodiments may have similar or different dimensions.

It is seen that the embodiment 10a illustrated in FIGS. 4A-4D (or any other embodiment) may take, positionally, one of the three locations with respect to the pre-compression of the gasket adjacent the workpiece. In FIG. 4B, it is seen that improved gasket 10a may be dimensioned, for example, die cut or molded, such that the outer edge of the second portion 16 is vertically aligned with the outer edge of the workpiece, such as the outer edge of an aircraft antenna, attached to a base which may represent the fuselage of the aircraft.

In FIG. 4B, the cut of the gasket with respect to the workpiece will be called straight or regular cut. However, in 4C it may be seen that body 12, typically second portion 18 thereof and, optionally, skeleton 18/20 extends pre-compression slightly beyond the outer edge of the workpiece of the gasket. The gasket of FIG. 4C may be termed "overcut."

Figure 4D:
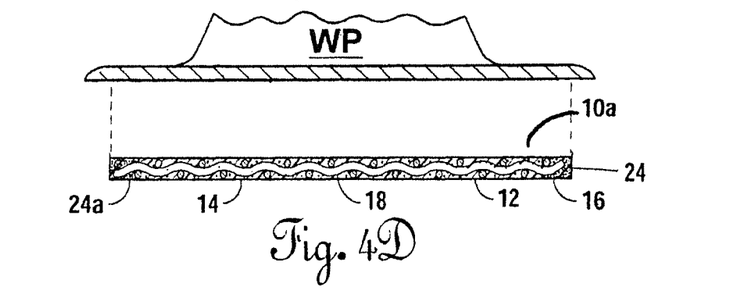
FIG. 4D illustrates the first embodiment in an "undercut" application of Applicants' improved gasket wherein the firmer outer perimeter of the gasket is undercut and wherein prior to compression the outer perimeter of the workpiece extends slightly beyond the outer perimeter of the gasket.

Turning to FIG. 4D, an "undercut" gasket may be seen wherein the outer edge of the outer perimeter portion 16 and skeleton 18/20 does not reach, pre-compression, the outer edge of the workpiece.

The straight or regular cut gasket may be desired where there is only a slight bulge desired, post-compression, of the gasket at the workpiece perimeter. On the other hand, a slight overcut gasket may be provided to improve the aesthetics of the sealing adjacent the workpiece base and outer perimeter area see in FIG. 4C.

Figure 4E:
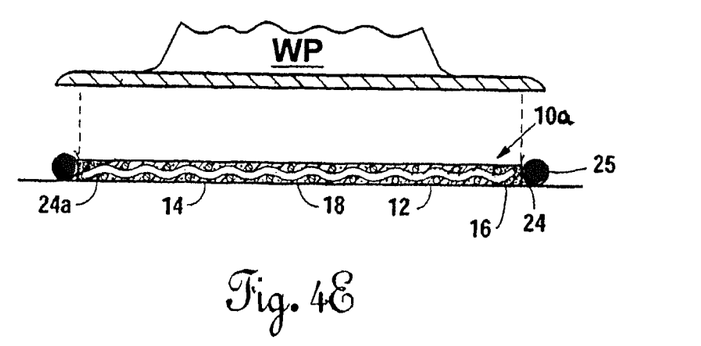
FIGS. 4E and 4F illustrate side elevational views of an embodiment of Applicants' invention having a separate perimeter member, engageable after attachment of workpiece and gasket to the base.
Figure 4F:
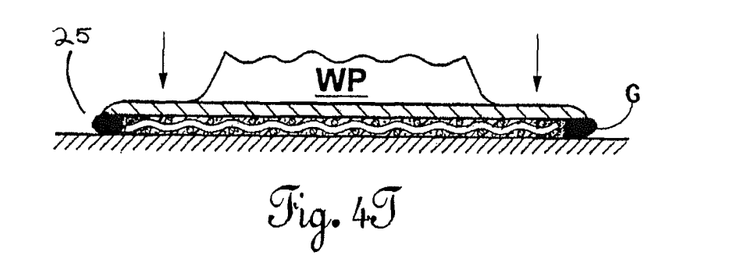
Figure 5:
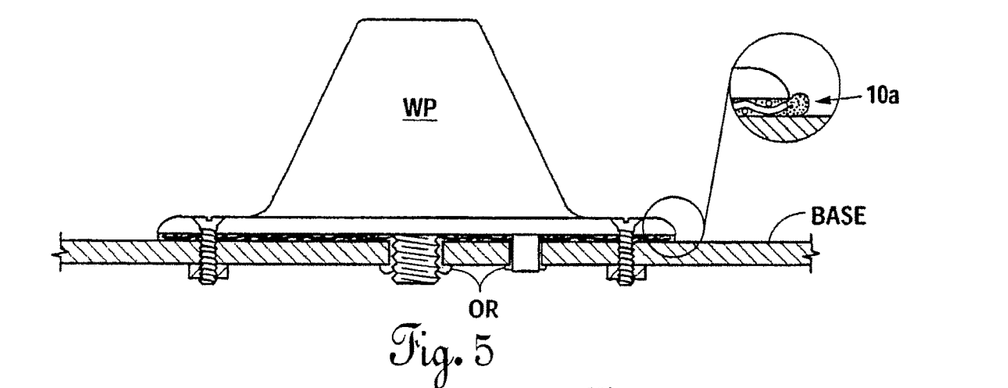
FIG. 5 illustrates a side elevational view of a first embodiment of Applicants' improved gasket as set forth in FIGS. 4A and 4B, under compression between a workpiece and a base, illustrating the manner in which the firmer outer perimeter reduces seepage or overrun along the outer perimeter of the workpiece.

In FIGS. 4E and 4F, undercut gasket 10a may be used for a number of reasons, including the ability to leave a slight gap post-compression for the insertion of a second material or a second gasket 25, bead or an O-ring or the like in the gap G created between the workpiece and Base (outer edge) post-compression.

FIGS. 4E and 4F illustrate the embodiment of Applicants' device using an undercut pre-cured gasket 10a, which may be a gasket comprised of a pre-cured sticky gasket 10g of either the single or dual firmness. It is undercut and even under compression may leave a small gap G, that is, a recess back from the outer edge of the workpiece. Applicants may provide a pre-cured, preformed elastomeric second gasket 25. Second gasket 25 is configured to lay adjacent the outer perimeter of pre-cured gasket 10a. Workpiece is placed under slight compression and an elastic UV resistant gasket 25 is urged at least partially into gap G. Further compression may be applied to allow some of the body 12 to be squeezed up to the inner boundaries of undercut gasket 10a and also allow the outer edge of second gasket 25 to protrude from gap G as seen in FIG. 4F.

In other applications, the undercut of FIG. 4D may be limited to from several mil up to about 250 mil, in which case, under compression, the expansion of the second portion 15 may move it out slightly so it is flush with the outer edge of the workpiece. In still other embodiments, the undercut may remain under either partial or full compression and a flowable curable polyurethane or other suitable material may be applied at the gap at the undercut (see below). The applied material may itself provide a bead beyond the edge of the workpiece.

FIGS. 6, 8, 10, 12, and 14 illustrate additional embodiments (two through six) 10b, 10c, 10d, 10e, and 10f, respectively, of Applicants' improved gaskets, each illustrating differences in the shape of second portion 16 may take as set forth in more detail below.

By varying the shapes of the outer edges, including the cross-sectional shapes, in some cases a more effective seal may be provided, as may be needed in different applications. Further, the post-compression visual aesthetics of the seal may be enhanced.

It is noted that any of the embodiments 10a-10f may be straight cut, undercut or overcut as needed for effective sealing and/or aesthetic purposes. Moreover, it is seen that any of the embodiments may have a differential firmness wherein the softer first portion 14 has a first or greater tackiness than the outer portion 16, which may be firmer and less tacky.

Figure 6:
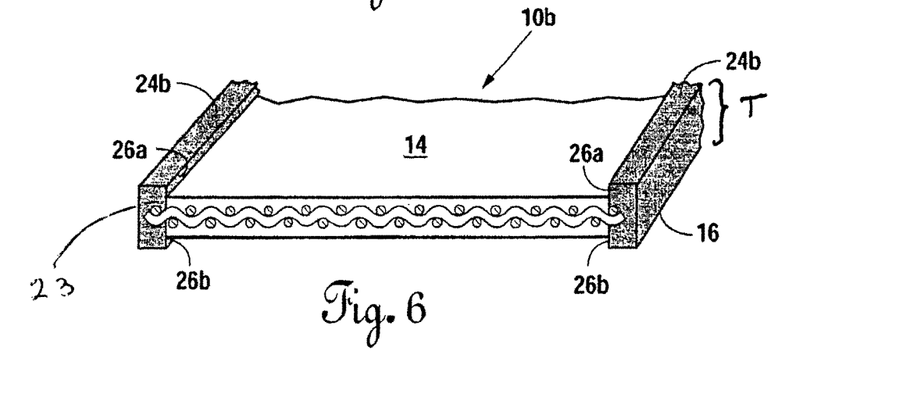
FIG. 6 illustrates a side cutaway perspective view of a second embodiment of Applicants' improved gasket.

FIG. 6 illustrates a cross-sectional shaped perimeter 24b of the second flexible firmer outer portion 16 at the perimeter of the body 12 of embodiment 10b. Cross-section 24b is seen to be similar to cross-section 24a of embodiment 10a (see FIG. 4E). Cross-section 24a has three generally straight sides and a common face 23 and a thickness approximately equal to the first portion 14. Cross-section 24b of embodiment 10b (see FIG. 6) is seen to have an upper lip 26a and a lower lip 26b extending above and below the top surface 14a and bottom surface 14b of the first portion 14. Lips 26a/26b may extend several mil (or typically up to about 20 mil) above the thickness of first portion 14 defined as the distance between top surface 14a and bottom surface 14b thereof. Typically the overall thickness T of the regular sided rectangle seen in cross-section 24b is about 75 mil (range about 25 mil to 100 mil) or any other suitable thickness.

Figure 7:
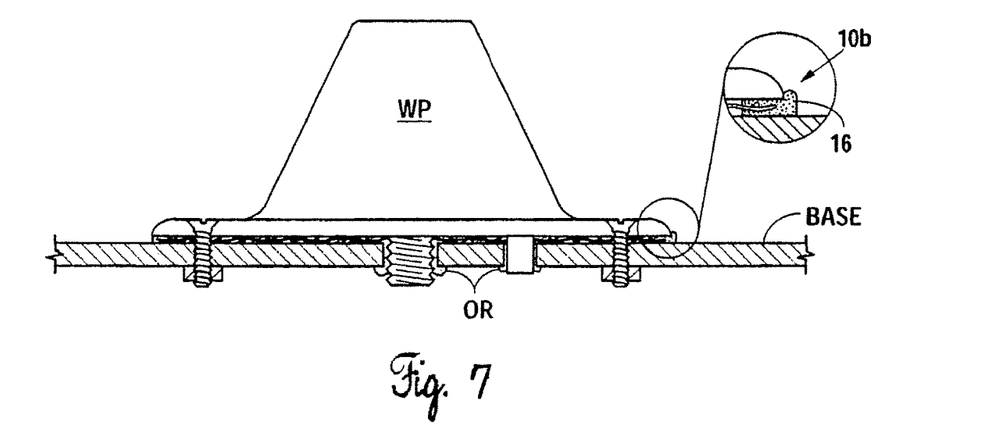
FIG. 7 is an illustration of the embodiment of FIG. 6 under compression between a workpiece and a base.

FIG. 7 illustrates that a regular cut or slightly overcut embodiment 10b of Applicants' improved gasket may provide a slightly contoured or bulging profile, seen in cross-section across the outer edge of the workpiece. Gasket 10b is seen under compression between a workpiece which may be an aircraft antenna and a base which may be an aircraft fuselage.

Figure 8:
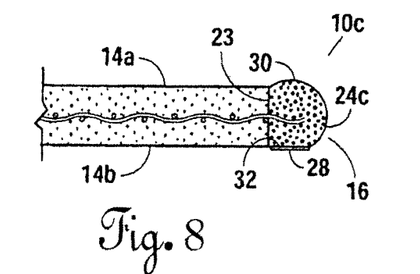
FIG. 8 illustrates a third embodiment of Applicants' improved gasket in side cross-sectional elevational view.
Figure 9:
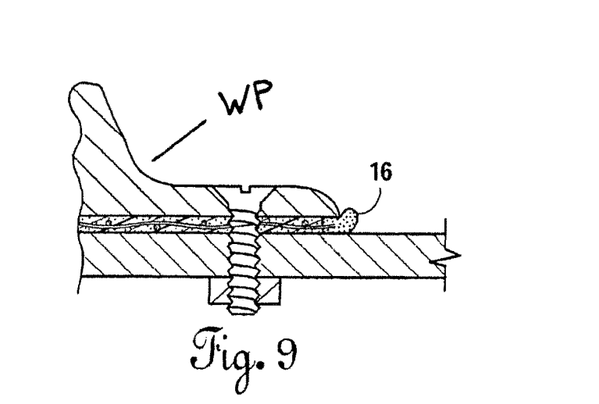
FIG. 9 illustrates a cross-sectional view of the gasket set forth in FIG. 8, under compression showing the edge of a workpiece and the edge of a base.

FIGS. 8 and 9 illustrate a perimeter cross-section 24c that is seen to be plano-convex gasket 10c. Here, as with the embodiments set forth in 10a/10b, there is a common face 23 between firmer perimeter portion 16 and less firm first portion 14. Here a convex section 30 covers an arc typically greater than 90° and a planar section 32 represents an extension of bottom surface 14b. An adhesive strip 28, such as double sided tape, may be provided along planar section 32 on this embodiment or any other embodiment, which may provide for pre-compression placement and positioning of any of the improved gaskets against either the workpiece or the base prior to compression.

FIG. 9 illustrates one configuration that the embodiment illustrated in FIG. 8, embodiment 10c of Applicants' improved gasket, may take under compression between the workpiece and base. A rounded surface, in profile, may be seen extending slightly beyond the edge of the workpiece.

The increased thickness of the second portions, as illustrated in embodiments 10b-10e, are believed to, in part, provide greater resistance to the migration of the soft material of first portion 14 and the prevention of overrun outside the outer perimeter of Applicants' dual firmness or composite gasket.

Figure 10:
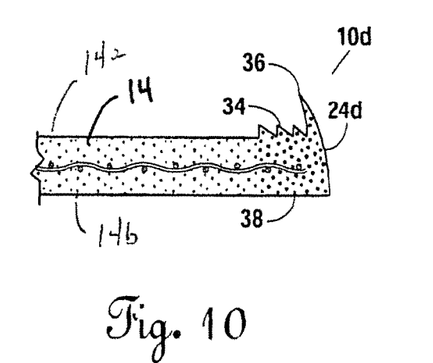
FIG. 10 is a fourth embodiment of Applicants' present invention in cross-sectional elevational view.
Figure 11:
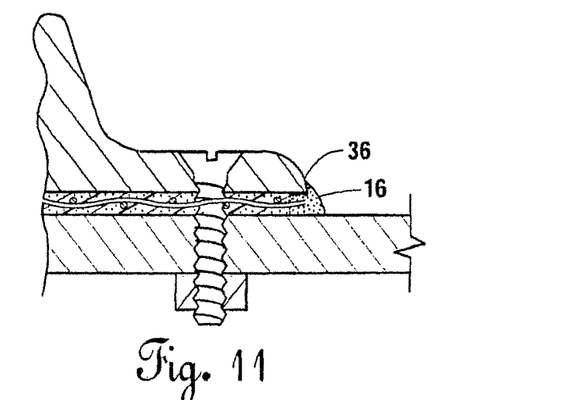
FIG. 11 illustrates the embodiment of FIG. 10 under compression between a workpiece and a base, along the edge of the workpiece.

In FIG. 10, illustrating embodiment 10d, a ribbed toothed surface 34 is provided as seen in cross-section 24d, as either an upper or a lower surface of the perimeter portion 16 (ribbed toothed upper surface shown). The toothed upper surface may help prevent creep or overrun of the material comprising the first portion 14 as it provides ridges that will flatten somewhat under compression. Moreover, improved gasket 10d may include an upstanding wall portion 36 may be provided in the overcut area for both aesthetic and creep prevention. In FIG. 11, it is seen how outer walled portion 36 may be contoured to fit snugly adjacent the outer perimeter of the workpiece. The cross-sectional view seen in FIG. 10 may be termed a toothed-wall.

Figure 12:
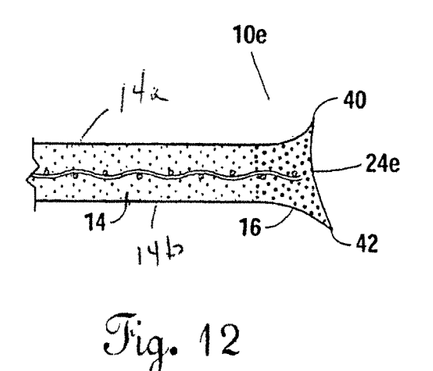
FIG. 12 illustrates a fifth embodiment of Applicants' improved gasket in cross-sectional elevational view.
Figure 13:
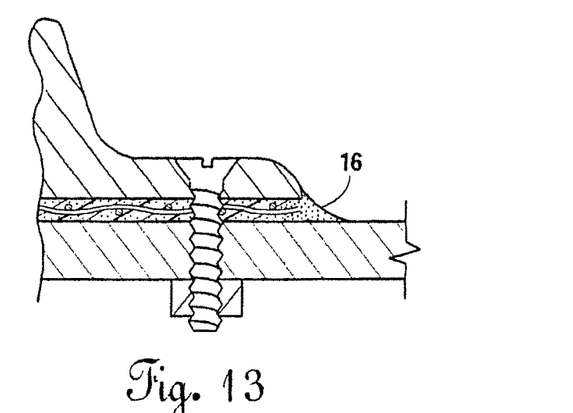
FIG. 13 illustrates the embodiment of FIG. 12 in cross-sectional elevational view under compression at or near the perimeter of a workpiece.

Turning to FIGS. 12 and 13, yet another embodiment 10e of Applicants' improved gasket is illustrated. Embodiment 10e may be seen to provide a perimeter portion 16 that is multi-concave in cross-section 24e, here having concave top and bottom walls and, optionally, a concave outer wall. This may provide for a slight concavity to the post-compression shape and sealing against the surface of the workpiece as illustrated in FIG. 13.

Figure 14:
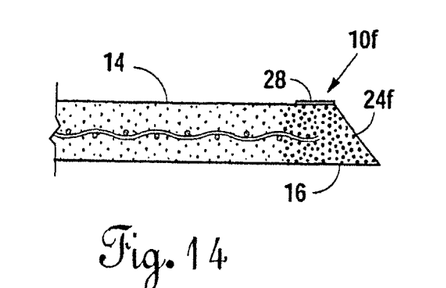
FIG. 14 illustrates a sixth embodiment of Applicants' present invention in cross-sectional side elevational view.
Figure 15:
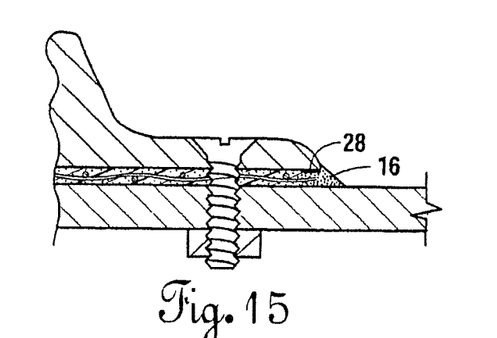
FIG. 15 illustrates the gasket of FIG. 14 under compression between the workpiece and a base, near the edge of the workpiece.

FIGS. 14 and 15 illustrate the use of double adhesive strip 26 on a top wall of perimeter portion 16 and another embodiment 10f with a shaped cross-section 24f, here having a trapezoid (parallelogram) or quadrilateral shape with the face opposite common face 23 being slanted, typically outward from the top to bottom. While the thickness of outer portion 16 is illustrated to be the same as inner portion 14, outer portion 16 may be thicker. As in other embodiments, the embodiment 10f of Applicants' improved gasket may be either straight cut, undercut or slightly overcut. In FIG. 15, embodiment 10f is illustrated under compression.

FIGS. 16A thru 21B illustrate methods of preparing Applicants' various embodiments of their improved gasket.

Figure 16A:
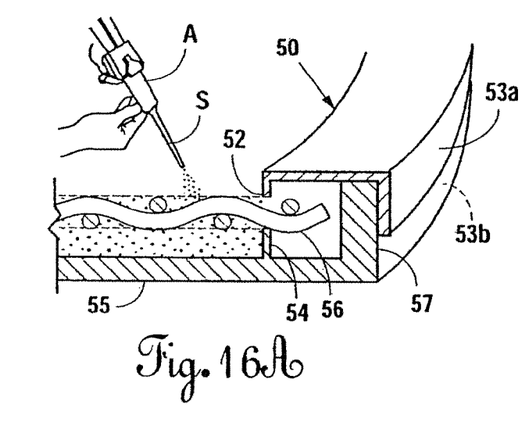
FIGS. 16A and 16B illustrate in cross-sectional view a manner of manufacturing the first embodiment of Applicants' device.
Figure 16B:
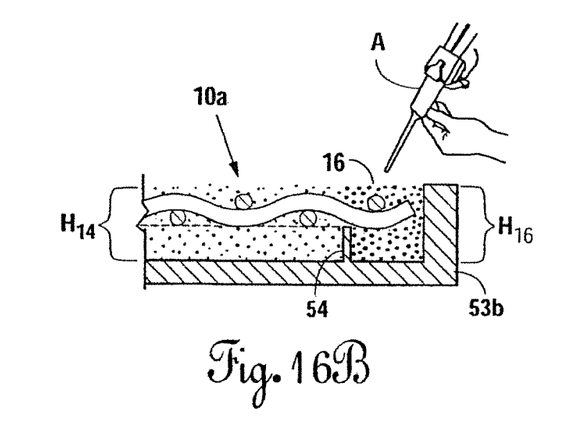

FIGS. 16A and 16B illustrate a cross-sectional view in which a two-piece mold or multi-piece mold 50 is provided for embodiment 10a, wherein multi-piece mold 50 is defined by a top divider 52 and a bottom divider 54, with a gap 56 therebetween for the skeleton to protrude through. The two separate pieces are provided in a base 55 providing an upstanding bottom divider 54 and an outside wall 57. A second piece may include top divider 52, which along with bottom divider 54, will be typically very thin metal, which may be either solid or perforated to allow flow of the first material comprising first portion 14 and a second material providing the second portion 16 thereof, so there may be intermingling during cure.

A cap 53, including top divider 52, may be removed and, to start the procedure, skeleton 18/20 is placed across base 53 supported on the top edge of bottom divider 54 and extending partway past bottom divider 54 into space that will be filled with the second (firmer) composition. The first composition may then be poured pre-mixed in the snout S of the applicator A in known ways, and allowed to self-level to the desired height, here H 14 and H 16 being equal. Following curing, cap 53 and top divider 52 are removed leaving the cross-section illustrated in FIG. 15B. At this point, applicator A, this time having second material, a composition firmer than the composition of the first material, will be applied to level H 16. When this cures, the gasket 10a can be carefully removed and is ready for use.

Figure 17A:
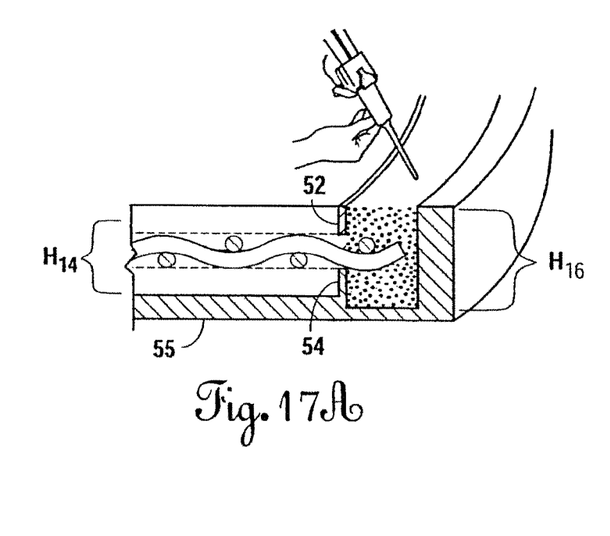
FIGS. 17A and 17B illustrate in cross-sectional elevational view a method of making the second embodiment of Applicants' improved gasket.
Figure 17B:
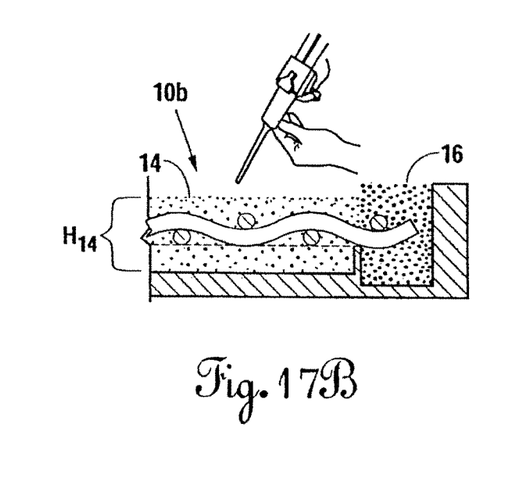

FIGS. 17A and 17B illustrate similar procedures, which can be used when H 16 is greater than H 14, for embodiment 10b. Here it will be seen that top divider 52, bottom divider 54, and gap 56 add up to a height of about H 16. Here, perimeter 16 can be poured first, allowed to cure and, after removal of top divider 16, the first portion 14 can be injected to a height of approximately H 14 leaving, when cured, a gasket substantially resembling embodiment 10b with a cross-section 24b.

Figure 18A:
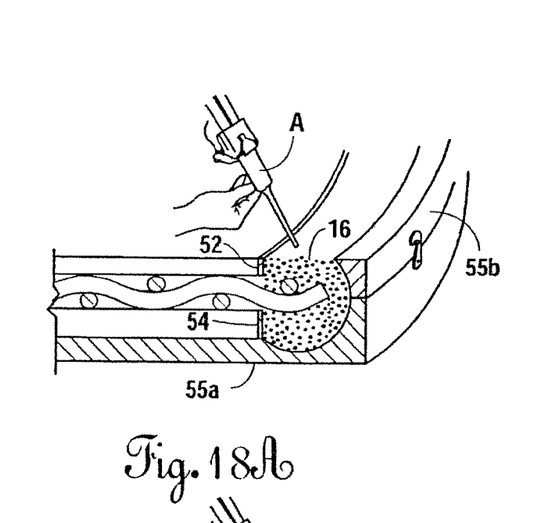
FIGS. 18A and 18B illustrate in cross-sectional view, a method of making the third embodiment of Applicants' present invention.
Figure 18B:
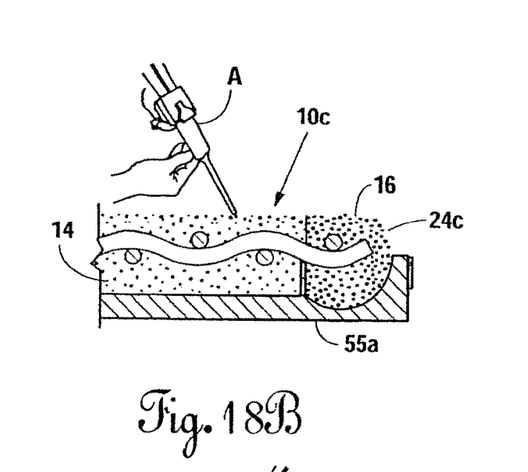

FIGS. 18A and 18B illustrate a manner in which a two-piece base 55 having lower portion 55a and upper portion 55b may be joined together to provide the curved section of embodiment 10C. Here, outer portion 16 may be injected first and then inner portion 14 may be injected to the desired height. Portion 55b of base 55 may be removed for ease of removal of the gasket embodiment 10c having cross-section 24c following curing of both portions 14/16.

Figure 19A:
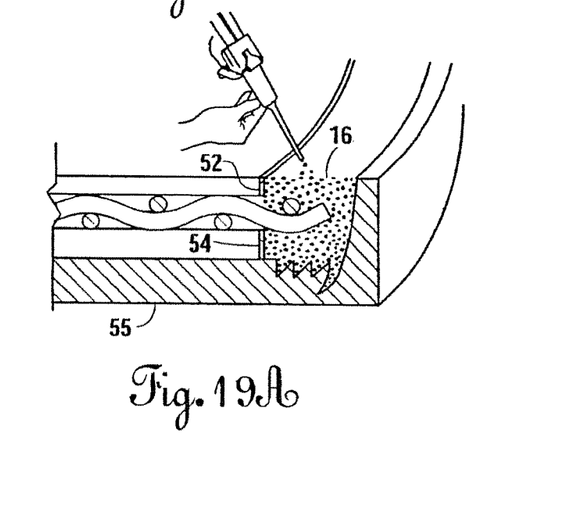
FIGS. 19A and 19B illustrate in cross-sectional side elevation, a method of making the fourth embodiment of Applicants' gasket.
Figure 19B:
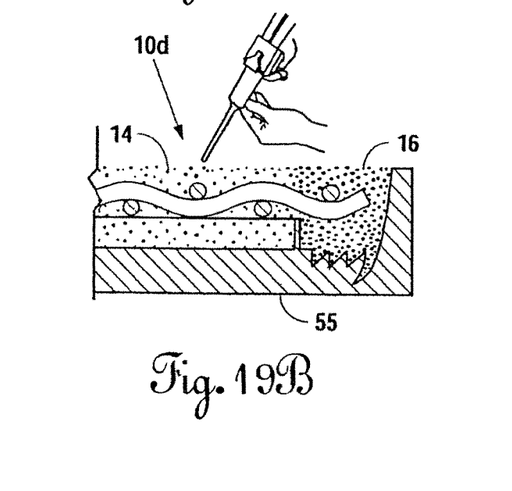

FIGS. 19A and 19B also disclose the two-step method and two piece molds of the previous embodiment providing a first pouring or injecting of one of the first or second portions when the top divider and bottom divider are adjacent one another and a second pouring of the other or first or second portion following the removal of the top divider. Here, it is seen that base 55 is provided with a surface that is shaped to conform to the desired shape of outer portion 16, here, see 24d of embodiment 10d.

FIGS. 20A, 20B, 21A, and 21B also illustrate a manner of configuring the mold, typically in two pieces, to conform to the desired end product having a specifically configured first portion 14 and a second portion 16 of a different, harder consistency.

Figure 20A:
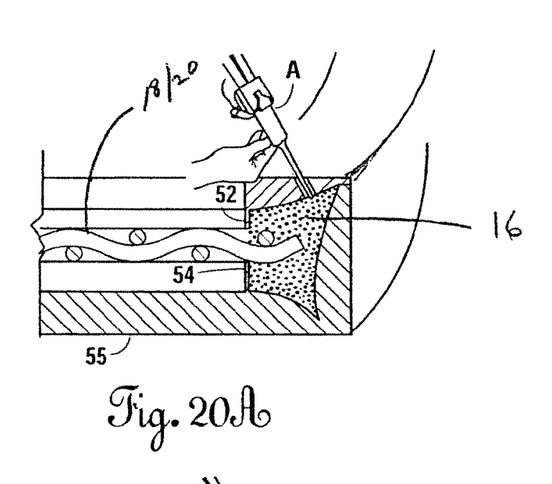
FIGS. 20A and 20B illustrate a method of making the fifth embodiment of Applicants' improved gasket.
Figure 20B:
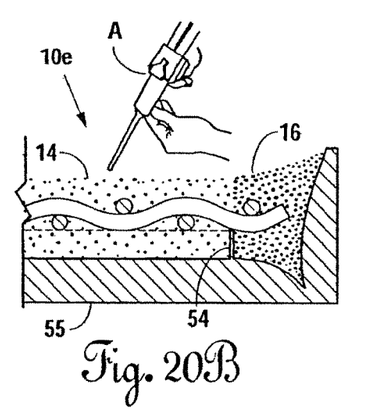

FIG. 20A illustrates top divider and bottom divider working together to provide a perimeter region in which a flowable, pre-cured mix can be injected to provide a proper or suitable shape to the firmer portion, while allowing some of the skeleton to extend into the perimeter portion. Once the perimeter portion has cured top divider 52 may be removed and, as set forth in FIG. 20B, the less sticky or less firm pre-cured mix may be injected and allowed to cure.

Figure 21A:
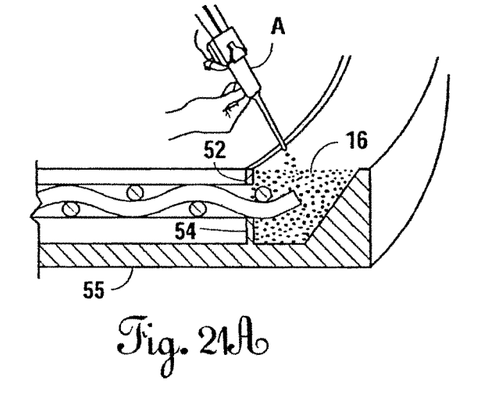
FIGS. 21A and 21B illustrate a method of making the sixth embodiment of Applicants' improved gasket.
Figure 21B:
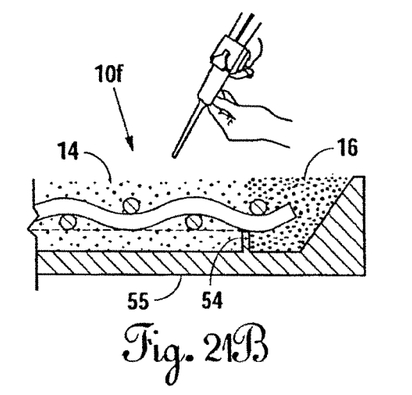

FIG. 21 illustrates a similar process, but the top divider is not needed to provide full coverage as the moldable material may self-level as indicated.

With reference to FIGS. 22-27, a gasket 10g is represented. This gasket may be any of the dual tackiness and/or firmness as set forth herein. However, with the disclosure that follows, it is pointed out that the gasket 10g may be any of the gaskets of the prior art, but with features set herein, including exposed or non-exposed skeleton and undercut or straight cut features. Furthermore, a bead 58 will be applied to the outer edge of body 12. The bead is not cured, and will cure in place after the (cured) gasket is between the workpiece and base. Moreover, the bead is typically forced into a gap G left b the body of the gasket not reaching the edge of the workpiece. The skeleton 18/20 may or may not extend beyond the outer edge of the body. When it does, it will help bead 58 adhere to the gasket.

Figure 22:
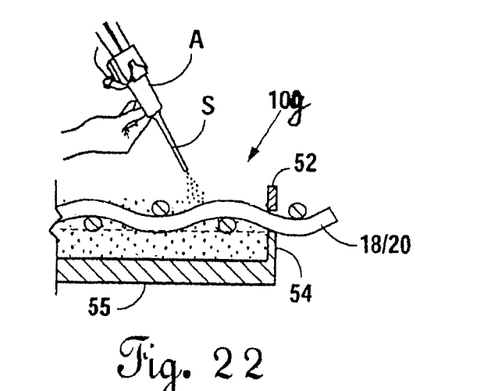
FIG. 22 illustrates an exposed skeleton, beyond the body of the gasket being made by the use of a mold.
Figure 23:
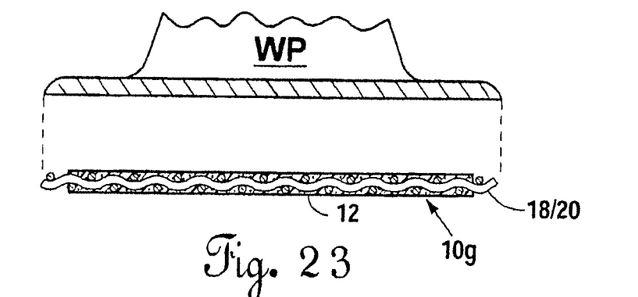
FIG. 23 illustrates the cured, exposed skeleton gasket made by the step illustrated in FIG. 22 aligned with a workpiece which will be applied to a base.

FIG. 22 illustrates the preparation of a gasket 10g, wherein the gasket's skeleton 18/20 extends beyond the outer edges of body 12. Furthermore, in FIG. 23, Applicants illustrate that gasket 10g, which may be either of a single or dual tackiness as set forth above, may be undercut with respect to the workpiece. Typically, however, the bare edges of skeleton 18/20 will go up to the edge of the workpiece as illustrated in FIG. 23.

Figure 24:
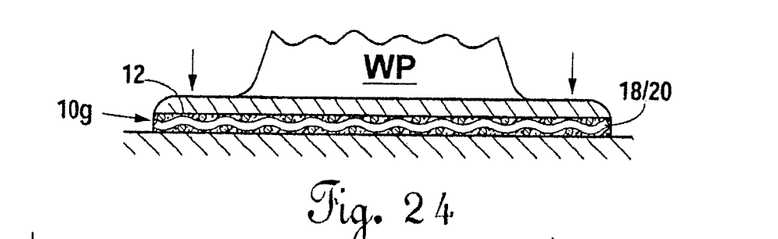
FIG. 24 illustrates the gasket of FIGS. 22 and 23, under compression between the workpiece and base.

In FIG. 24, gasket 10g is seen under sufficient compression such that some of the material comprising body 12 will ooze out to about the edge of the workpiece.

Figure 24A:
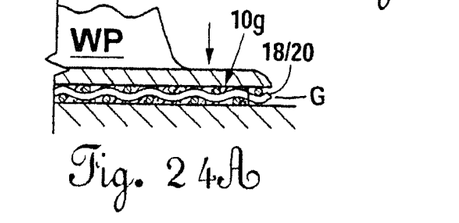
FIG. 24A illustrates a gasket under compression between the workpiece and base, but leaving an exposed skeleton and a gap.

FIG. 24A illustrates an embodiment of the undercut exposed skeleton gasket embodiment 10g, which may be either single or dual tackiness, wherein under some or complete compression material of body 12 does not reach the outer edge of the workpiece. Here, as with the previous embodiment, there is exposed or bare skeleton 18/20 in gap G, but even under compression still leaves some of the skeleton exposed.

Figure 24B:
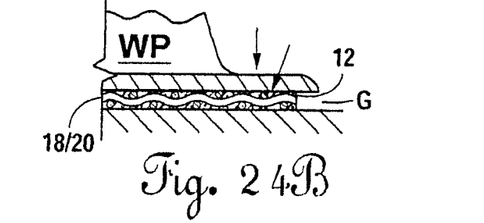
FIG. 24B illustrates a gasket under compression leaving a gap, but no exposed skeleton.

In FIG. 24B, any of the early embodiments are illustrated in an undercut configuration (no exposed skeleton) when a gap G is left even after compression (either partial or complete) of the workpiece against the base.

Figure 25:
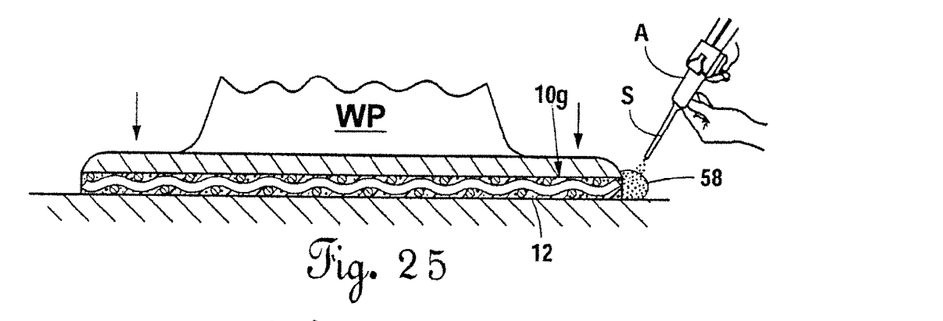
FIG. 25 illustrates the application of a bead to the embodiment of FIG. 24.
Figure 25A:
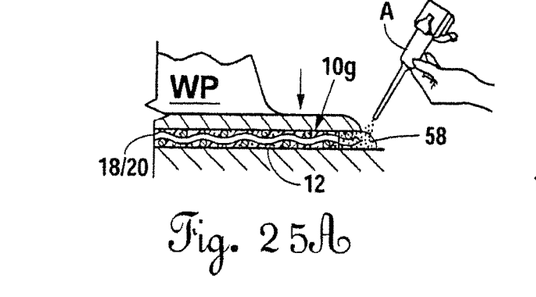
FIG. 25A illustrates the application of a bead to the embodiment of FIG. 24A.

Turning to FIG. 25, it is seen that the embodiment of FIG. 24, wherein under compression body material 12 squeezes up to about the edge of the workpiece, bead 58 may be applied through snout S of an applicator applying a curable mix that will cure after application. The material used for the bead will typically be UV resistant and bond to the body 12 of the gasket 10g. One such curable mix from which bead may be made of a polysulfide which has suitable adhesion to a polyurethane body and which is somewhat UV resistant.

Figure 26:
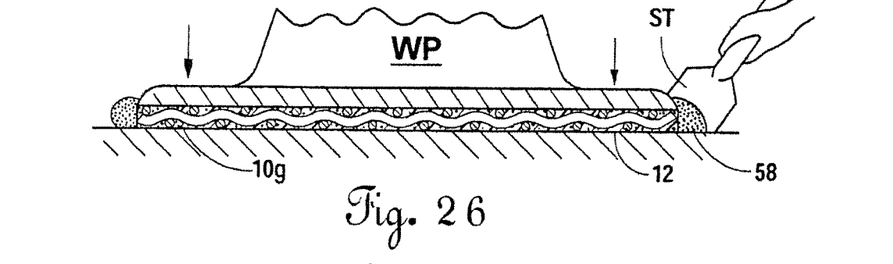
FIG. 26 illustrates a bead being shaped in an optional step, which shaping may be applied to any of the foregoing gap, gapless, exposed, non-exposed skeleton embodiments.

FIG. 26 illustrates the use of a shaping tool ST prior to curing of the bead to shape and to remove excess bead material from the contact between the workpiece, the base, and the edge of gasket 10g.

Figure 25B:
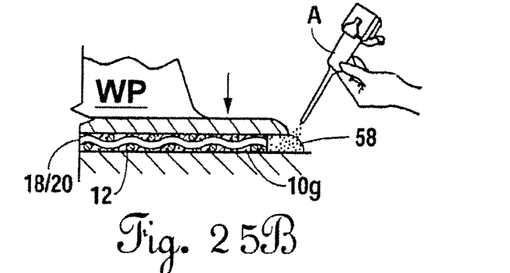
FIG. 25B illustrates the application of a bead to the embodiment of FIG. 24B.

Turning back to FIGS. 25A and 25B, it is seen that bead 58 may be applied to the gap G when an undercut gasket is provided that has an exposed skeleton 18/20 as in FIG. 25A. The term "undercut" here is used to describe an undercut of the body material 12 where, even under compression, the body material leaves a gap between it and the edge of the workpiece. Such a gap is then filled after the workpiece and gasket are placed on the base (see FIG. 25), with a suitable bead material to be cured with the workpiece in place. This bead material may be shaped as illustrated in FIG. 26 or otherwise formed into a suitable shape. In FIG. 25B, undercut refers to the gasket under compression, wherein neither the skeletal material nor the body reaches the edge of the workpiece. Here the gap is filled with the bead 58 (which may extend beyond the edge of the workpiece) as in FIGS. 25 and 25A, and may be shaped.

Figure 27:
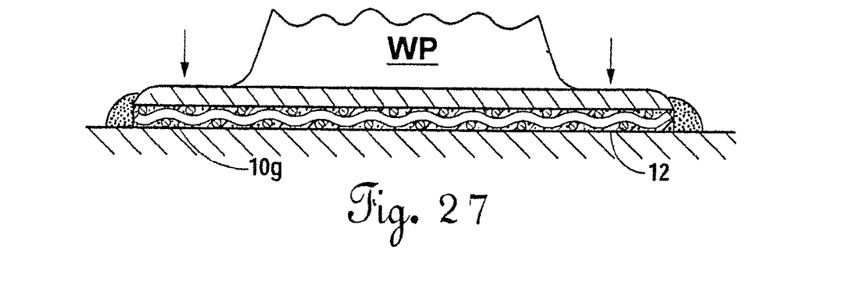
FIG. 27 illustrates the cured bead integral with the body and adjacent, typically contacting the workpiece and base.

FIG. 27 illustrates the final cured bead 58 adjacent to and sealed against gasket 10g, workpiece WP, and the base. The bead is typically firmer and/or less tacky than body 12.

All dimensions set forth herein are approximate and the ranges may be varied to suit specific applications.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An assembly for use on an aircraft, the assembly comprising:
   an aircraft base structure having a substantially flat face;
   an aircraft workpiece structure having an outer perimeter and a substantially flat face positionable adjacent the aircraft base structure with the aircraft workpiece structure flat face adjacent the flat face of the aircraft base structure;
   a gasket, the gasket having a flexible body comprising a pliable, resilient, deformable gel, the body having an inner portion and an outer portion, the inner portion comprising an upper and a lower surface that are generally parallel to each other and have a length and a width much greater than a thickness of the inner portion, the gasket being compressed by the aircraft workpiece structure and the aircraft base structure respectively contacting the upper surface and the lower surface during assembly, the outer portion substantially surrounding the inner portion about its length and width;
   wherein the inner portion has a first firmness and the outer portion has a second firmness, the second firmness being greater than the first firmness;
   wherein the outer portion comprises an outer perimeter having an upper surface, a lower surface, and an edge between the upper and lower surfaces, wherein the outer perimeter of the outer portion generally conforms to the outer perimeter shape of the aircraft workpiece structure and wherein the outer perimeter of the aircraft workpiece structure contacts one of the upper or lower surfaces of the outer perimeter of the outer portion, wherein the aircraft base contacts the other of the upper or lower surface of the outer perimeter of the outer portion, and wherein the edge contacts neither the aircraft workpiece, the aircraft base nor the inner portion of the body, nor any other part of the aircraft when the gasket is compressed between the aircraft workpiece structure and the aircraft base structure, the compression resulting in the aircraft workpiece and the aircraft base being spaced apart.

2. The assembly of claim 1, wherein the inner portion of the gasket has a durometer hardness, as measured by a 37.5 g, half cone penetrometer, of between 75 and 150.

3. The assembly of claim 1, wherein the second portion of the gasket has a "00" durometer hardness of between 15 to 75.

4. The assembly of claim 1, wherein the inner portion of the gasket has a firmness of between 75 and 150, as measured by a 37.5 g half cone penetrometer, and wherein the outer portion has a "00" durometer hardness of between 15 to 75.

5. The assembly of claim 1, wherein the inner portion of the gasket is a polyurethane gel.

6. The assembly of claim 1, wherein the outer portion of the gasket is tabular.

7. The assembly of claim 1, wherein the outer portion of the gasket is convex.

8. The assembly of claim 1, wherein the outer portion of the gasket is concave.

9. The assembly of claim 1, wherein the outer portion of the gasket is toothed.

10. The assembly of claim 1, wherein the outer portion of the gasket is trapezoidal.

11. The assembly of claim 1, further including an adhesive portion configured for placement between the body and at least one of the workpiece structure or the base structure.

12. The assembly of claim 1, further including an elastomeric perimeter gasket member, configured to lay adjacent and be in contact with the second portion of the body.

13. The assembly of claim 1, wherein the outer portion of the body is undercut.

14. The assembly of claim 1, wherein the outer portion of the body is straight cut.

15. The assembly of claim 1, wherein the outer portion of the body is overcut.

16. The assembly of claim 1, wherein the gasket further includes an open body skeleton between the upper and the lower surface thereof.

17. The assembly of claim 16, wherein the skeleton of the gasket is a woven flexible material.

18. The assembly of claim 16, wherein the skeleton of the gasket is metallic.

19. The assembly of claim 16, wherein the inner portion of the gasket has a durometer hardness, as measured by a 37.5 g, half cone penetrometer, of between 75 and 150.

20. The assembly of claim 16, wherein the second portion of the gasket has a "00" durometer hardness of between 15 to 75.

21. The assembly of claim 16, wherein the inner portion of the gasket has a firmness of between 75 and 150, as measured by a 37.5 g half cone penetrometer, and wherein the outer portion has a "00" durometer hardness of between 15 to 75.

22. The assembly of claim 16, wherein the inner portion of the gasket is a polyurethane gel.

23. The assembly of claim 16, wherein the outer portion of the gasket is tabular.

24. The assembly of claim 16, wherein the outer portion of the gasket is convex.

25. The assembly of claim 16, wherein the outer portion of the gasket is concave.

26. The assembly of claim 16, wherein the outer portion of the gasket is toothed.

27. The assembly of claim 16, wherein the outer portion of the gasket is trapezoidal.

28. The assembly of claim 16, wherein the outer portion of the body is undercut.

29. The assembly of claim 16, wherein the outer portion of the body is straight cut.

30. The assembly of claim 16, wherein the outer portion of the body is overcut.

31. An assembly comprising:
   an aircraft antenna having an outer perimeter shape;

an aircraft fuselage adapted to receive the aircraft antenna;

a gasket for placement between the aircraft antenna and the aircraft fuselage, the gasket comprising:

a flexible gel body having an inner portion and an outer portion, the inner portion comprising an upper and a lower surface that are generally parallel to each other and have a length and a width much greater than a thickness of the inner portion, the inner portion being compressed by the aircraft antenna and the aircraft fuselage respectively contacting the upper surface and the lower surface during assembly, the outer portion substantially surrounding the inner portion about its length and width;

wherein the inner portion has a first firmness and the outer portion has a second firmness, the second firmness being greater than the first firmness;

wherein the outer portion comprises an outer perimeter having an upper surface, a lower surface, and an edge between the upper and lower surfaces, wherein the outer perimeter of the outer portion generally conforms to the outer perimeter shape of the aircraft workpiece structure and wherein the outer perimeter of the aircraft workpiece structure contacts one of the upper or lower surfaces of the outer perimeter of the outer portion, wherein the aircraft base contacts the other of the upper or lower surface of the outer perimeter of the outer portion, and wherein the edge contacts neither the aircraft workpiece, the aircraft base nor on the inner portion of the body, nor any other part of the aircraft when the gasket is compressed between the aircraft workpiece structure and the aircraft base structure, the compression resulting in the aircraft workpiece and the aircraft base being spaced apart;

wherein the inner portion and the outer portion are continuous;

wherein the gasket further includes a metallic, conductive skeleton, the skeleton engaging at least the inner portion of the body so as to lay between the upper and the lower surface thereof; and wherein the inner portion and the outer portion are comprised of polyurethane gel.

\* \* \* \* \*